US010005301B2

(12) United States Patent
Yamamoto et al.

(10) Patent No.: US 10,005,301 B2
(45) Date of Patent: Jun. 26, 2018

(54) RECORDING APPARATUS HAVING A COVER

(71) Applicant: SEIKO EPSON CORPORATION, Tokyo (JP)

(72) Inventors: Tsutomu Yamamoto, Azumino (JP); Kazuya Nagaoka, Matsumoto (JP); Shoichi Horiuchi, Matsumoto (JP); Takuya Kojima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/175,671

(22) Filed: Jun. 7, 2016

(65) Prior Publication Data

US 2017/0021651 A1  Jan. 26, 2017

(30) Foreign Application Priority Data

Jul. 24, 2015 (JP) ................................ 2015-146427

(51) Int. Cl.
| | |
|---|---|
| *B41J 29/13* | (2006.01) |
| *B41J 29/02* | (2006.01) |
| *H04N 1/00* | (2006.01) |
| *B41J 29/12* | (2006.01) |

(52) U.S. Cl.
CPC .............. *B41J 29/02* (2013.01); *B41J 29/13* (2013.01); *H04N 1/00411* (2013.01); *H04N 1/00551* (2013.01); *H04N 1/00559* (2013.01); *B41J 29/12* (2013.01)

(58) Field of Classification Search
CPC . B41J 29/12; B41J 29/13; B41J 29/02; H04N 1/0051; H04N 1/00559; H04N 1/00411
See application file for complete search history.

(56) References Cited

U.S. PATENT DOCUMENTS

| | | | | | |
|---|---|---|---|---|---|
| 3,876,127 | A | * | 4/1975 | Hares | ....................... B41J 29/13 16/422 |
| 6,494,633 | B1 | * | 12/2002 | Crosby | ....................... B41J 3/36 400/663 |

FOREIGN PATENT DOCUMENTS

| | | | |
|---|---|---|---|
| JP | H7-214586 A | | 8/1995 |
| JP | 2007210213 A | * | 8/2007 |
| JP | 2011-042125 A | | 3/2011 |

* cited by examiner

*Primary Examiner* — Sharon A Polk
(74) *Attorney, Agent, or Firm* — Workman Nydegger

(57) ABSTRACT

A recording apparatus includes a panel that supports an outer periphery of a display which displays various information; and a cover which is made of a resin material and is detachably mounted on the panel so as to cover the display in a state being mounted on the panel, wherein the cover includes a thin-wall portion and an inclined portion which serve as an outer area disposed along the outer periphery and a thick-wall portion which serves as an inner area disposed inside the outer area with the thickness of the outer area being smaller than the thickness of the inner area.

7 Claims, 9 Drawing Sheets

RECORDING APPARATUS HAVING A COVER

BACKGROUND

1. Technical Field

The present invention relates to recording apparatuses.

2. Related Art

There are recording apparatuses including a printer as a representative example that are capable of being used stand-alone without any connection to a computer. For example, JP-A-2011-42125 discloses such a printer in which a panel that supports a display displaying various pieces of information and images is provided tiltably through a tilting mechanism. An example of the display includes a display constituted by a liquid crystal display device. Since a surface of a liquid crystal display device is constituted by a transparent plate member made of resin or glass, a liquid crystal display device is generally not much resistant to impact and pressure. Accordingly, during transportation or storage, a resin molded cover covering the display is mounted on the display to protect the liquid crystal display device from external impact and pressure.

However, in recent years, displays of printers that can be used stand-alone have become larger and the covers covering the displays have become larger. Accordingly, a resin molded cover tends to have warpage, and a gap between the cover and the panel easily occurs when the cover is mounted on the panel to cover the display. Accordingly, during transportation or storage, disadvantageously, dust and dirt enter through the gap and adhere to the display.

SUMMARY

An advantage of some aspects of the invention is to provide a recording apparatus which includes a cover that is capable of suppressing warpage occurring in a resin molded cover to reduce adhesion of dust and dirt to the display.

The present invention can be implemented as the following embodiments or application examples.

APPLICATION EXAMPLE 1

A recording apparatus including: an apparatus main body which includes a recording unit that performs recording on a recording medium and a panel that supports a display which displays various information; and a cover made of a resin material, wherein the cover includes a covering section that covers the display and an abutment section formed on an outer periphery of the covering section so as to abut the apparatus main body, the covering section is made up of a first area formed along the abutment section and a second area disposed inside the first area, and the first area has a thickness smaller than a thickness of the second area.

According to the application example 1, the covering section is made up of the first area formed along the abutment section and the second area disposed inside the first area, and the first area has a thickness smaller than a thickness of the second area. Accordingly, when forming the cover by resin molding, the liquid resin material that has flowed to the first area solidifies more quickly than the liquid resin material that has flowed to the second area. Accordingly, warpage (deformation) in the outside area can be suppressed. As a result, the gap created between the apparatus main body and the cover can be made small, thereby preventing dirt and dust from entering through the gap and adhering to the display.

APPLICATION EXAMPLE 2

The above recording apparatus in which the abutment section has an outer periphery which includes a first side made up of a pair of sides and a second side which extends in a direction intersecting with an extending direction of the first side and is made up of a pair of sides having a length larger than a length of the first side, the first area of the covering section is made up of a first side area which is disposed along the first side and a second side area which is disposed along the second side, and a width of the second side area in a direction intersecting with an extending direction of the second side has a portion larger than a width of the first side area in a direction intersecting with an extending direction of the first side.

According to the application example 2, when forming the cover by resin molding, the liquid resin material in the first side area solidifies more quickly than in the second side area. Accordingly, warpage in the second side area can be suppressed.

APPLICATION EXAMPLE 3

The above recording apparatus in which the first area is connected to the second area and includes an inclined portion having an inclined surface that is inclined such that a thickness of the inclined portion continuously decreases toward the first area.

According to the application example 3, the liquid resin material is allowed to easily flow towards the outside area along the inclined surface of the mold for forming the inclined surface of the inclined portion. This allows the liquid resin material that has flowed to the first area to solidify in earlier stage than the liquid resin material that has flowed to the second area. Accordingly, warpage (deformation) in the first area can be suppressed.

APPLICATION EXAMPLE 4

The above recording apparatus in which the abutment section protrudes in a thickness direction of the covering section.

According to the application example 4, the abutment section of the cover serves as a rib. This increases the rigidity of the cover, thereby protecting the display from external impact and pressure. Furthermore, since a space is created between the covering section of the cover and the display, even if the covering section is bent towards the display due to external impact and pressure applied on the cover, contact between the covering section and the display can be avoided, thereby preventing the display from being damaged.

APPLICATION EXAMPLE 5

The above recording apparatus in which a flat area is formed in an extending direction of the abutment section, and a surface of the apparatus main body which abuts the flat area is a curved surface.

According to the application example 5, the abutment section of the apparatus main body and the abutment section of the cover reliably abut against each other, thereby preventing dust and dirt from entering the display side and adhering to the display.

APPLICATION EXAMPLE 6

The above recording apparatus in which a thick-wall portion that forms a hand held section is formed on the outer periphery of the covering section, a thin-wall portion that is connected to the thick-wall portion and extends along the thick-wall portion is formed on the covering section, and the thin-wall portion has a thickness smallest in the covering section.

According to the application example 6, when forming the cover by resin molding, the liquid resin material that has flowed to the thin-wall portion solidifies more quickly. Accordingly, warpage in the thin-wall portion can be suppressed. Therefore, deformation of the hand held section due to deformation of the thin-wall portion which serves as a support portion of the hand held section can be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
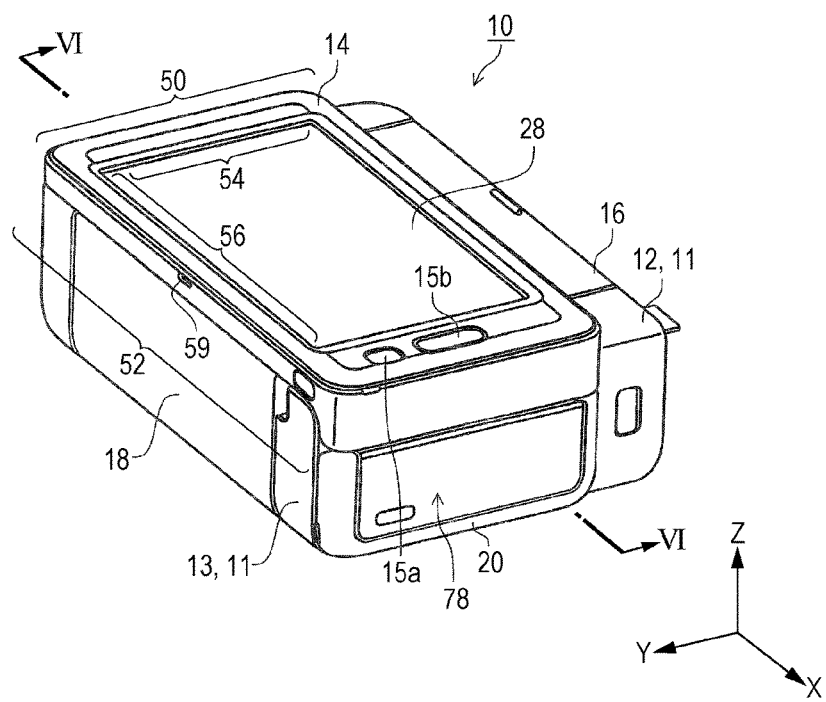
FIG. 1 is a perspective view of an outer appearance of a recording apparatus.

With reference to the drawings, an embodiment of a recording apparatus will be described below. In the X-Y-Z coordinate system shown in the drawings, the X direction is a scan direction of a recording head, the Y direction is a depth direction of the apparatus, and the Z direction is a gravity direction which is a height direction of the apparatus. Further, +Y direction is a front side of the apparatus, and −Y direction is a back side of the apparatus. Further, the right side as seen from the front side of the apparatus is defined as +X direction, and the left side as seen from the front side of the apparatus is defined as −X direction. Further, +Z direction is an upper side (including upper part, upper surface and the like) of the apparatus, and −Z direction is a lower side (including lower part, lower surface and the like) of the apparatus.

FIG. 1 is a perspective view of an outer appearance of an ink jet printer 10 (hereinafter, referred to as a printer 10) of a recording apparatus. The printer 10 has an outer appearance configuration which includes an apparatus main body 11, a panel 14 disposed on the upper surface (+Z surface) of the apparatus main body 11, a paper supply cover 16 that openably closes the rear side of the upper surface of the apparatus main body 11, a paper output cover 18 that openably closes the front surface (+Y surface) of the apparatus main body 11, and a handle 20 which is rotatable to the apparatus main body 11. Further, the apparatus main body 11 is made up of a main body upper part 12 which forms the upper part and a main body lower part 13 which forms the lower part.

The panel 14 supports the outer periphery of display 28. The panel 14 is formed with the outer periphery having a pair of short sides 50 which is an example of a first side and a pair of long sides 52 which is an example of a second side and is longer than a pair of short sides 50, and in this embodiment, has a substantially rectangular shape with four rounded corners.

Further, the display 28 is formed with the profile having a pair of short sides 54 and a pair of long sides 56, and is disposed on the panel 14 such that the length in the longitudinal direction (long side 56) corresponds to the length in the longitudinal direction (long side 52) of the panel 14. The display 28 has a size not smaller than that of a post card.

The display 28 of this embodiment has a function as a so-called touch panel that detects a pressed position on the display 28 so as to display various information such as edit information, print setting and current operation status and perform various input operations.

The printer 10 can be operated by operating the touch panel type display 28 as well as an operation button 15a and an operation button 15b disposed on the panel 14. Alternatively, the printer 10 can be operated via input operation of other devices such as a keyboard connected to the printer 10. The printer 10 and other devices can be connected wirelessly via infrared communication or connected with a wire.

Figure 2:
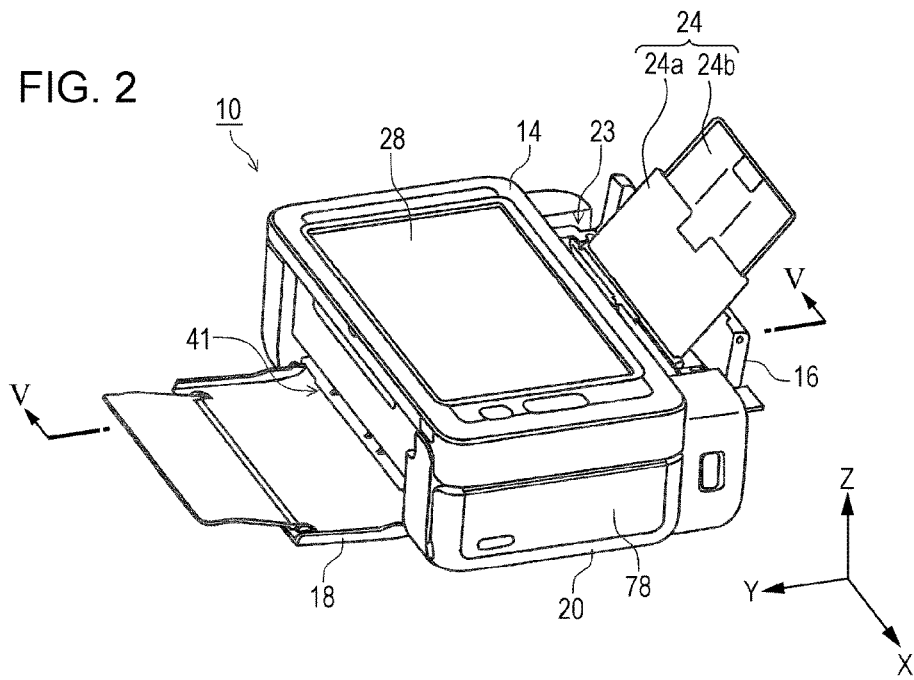
FIG. 2 is a perspective view of an outer appearance of the recording apparatus with a paper supply cover and a paper output cover open.

FIG. 2 is a perspective view of an outer appearance of the printer 10 with the paper supply cover 16 and the paper output cover 18 open. A medium setting section 23 on which a paper sheet P as a recording medium is set is provided on the upper side of the printer 10 close to the back side of the apparatus. The medium setting section 23 is open by opening the paper supply cover 16. The paper sheet P set on the medium setting section 23 is supported by a paper sheet support 24 composed of a first slide plate 24a and a second slide plate 24b.

The first slide plate 24a and the second slide plate 24b is housed in a housing section 26 (see FIG. 5) disposed on the apparatus main body 11 so as to be withdrawn from the housing section 26.

The paper sheet output unit 41 that outputs the recorded paper sheet P is disposed on the front side of the apparatus. The paper sheet output unit 41 is open by opening the paper output cover 18. The paper output cover 18 in an open state functions as a tray that supports the paper sheet P outputted from the apparatus main body 11.

Figure 3:
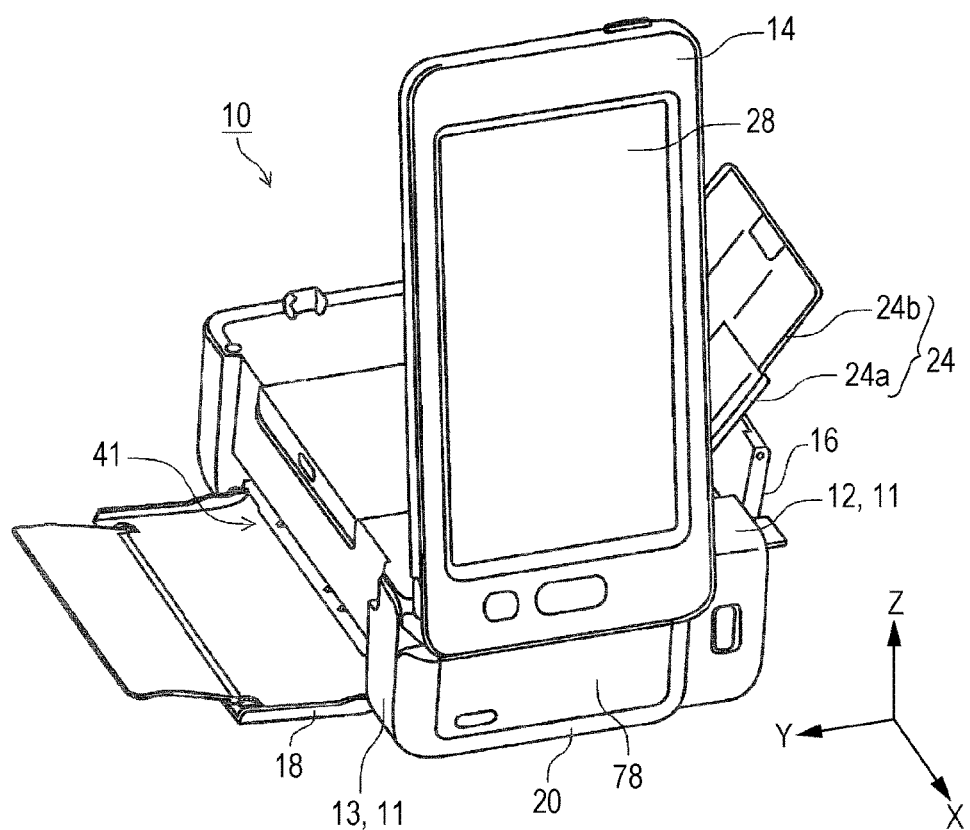
FIG. 3 is a perspective view of an outer appearance of the recording apparatus with a panel being rotated to expose an upper part of an apparatus main body.

FIG. 3 is a perspective view of an outer appearance of the printer 10 with the panel 14 being rotated to expose the upper part of the apparatus main body 11. The panel 14 includes the display 28 that displays various information disposed on the upper side of the panel 14, and is configured to rotate about a rotation shaft 70 (see FIG. 6) disposed on the +X side so as to open and close the apparatus main body 11 of the printer 10. The printer 10 can perform a paper supply and output operation and a recording operation in the open state of the panel 14.

The handle 20 is gripped when the printer 10 is carried. The main body lower part 13 includes a protruding section 78 that protrudes in the +X direction, and the protruding section 78 includes a rotation shaft 90 (see FIG. 6) about which the handle 20 is rotatable.

Figure 4:
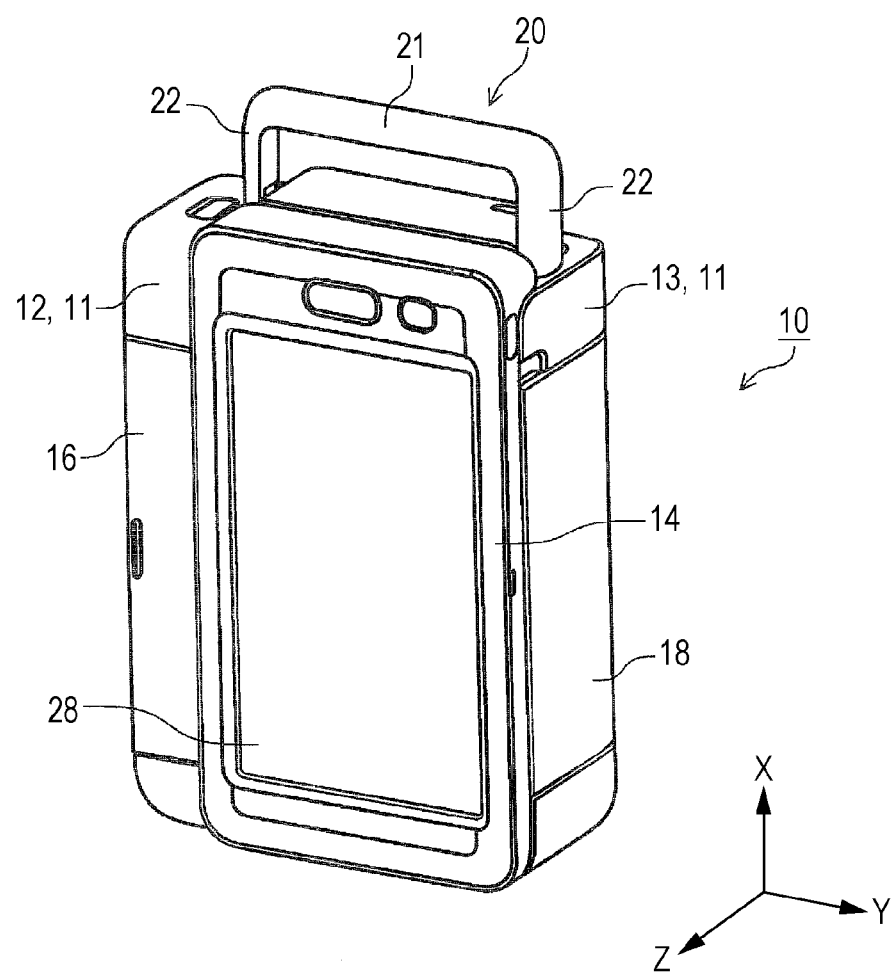
FIG. 4 is a perspective view of an outer appearance of the recording apparatus in a carrying state.

FIG. 4 is a perspective view of an outer appearance of the printer 10 in a carrying state of the printer 10. When carrying the printer 10, the handle 20 is rotated from the state shown in FIG. 1 to the state shown in FIG. 4 so that the handle 20 is positioned on the upper side of the gravity direction.

The handle 20 includes a grip 21 which extends substantially parallel to the depth direction (Y direction) of the apparatus main body 11, and a pair of arms 22 which are disposed on both ends of the grip 21 and extend in the direction intersecting with the grip 21.

Figure 5:
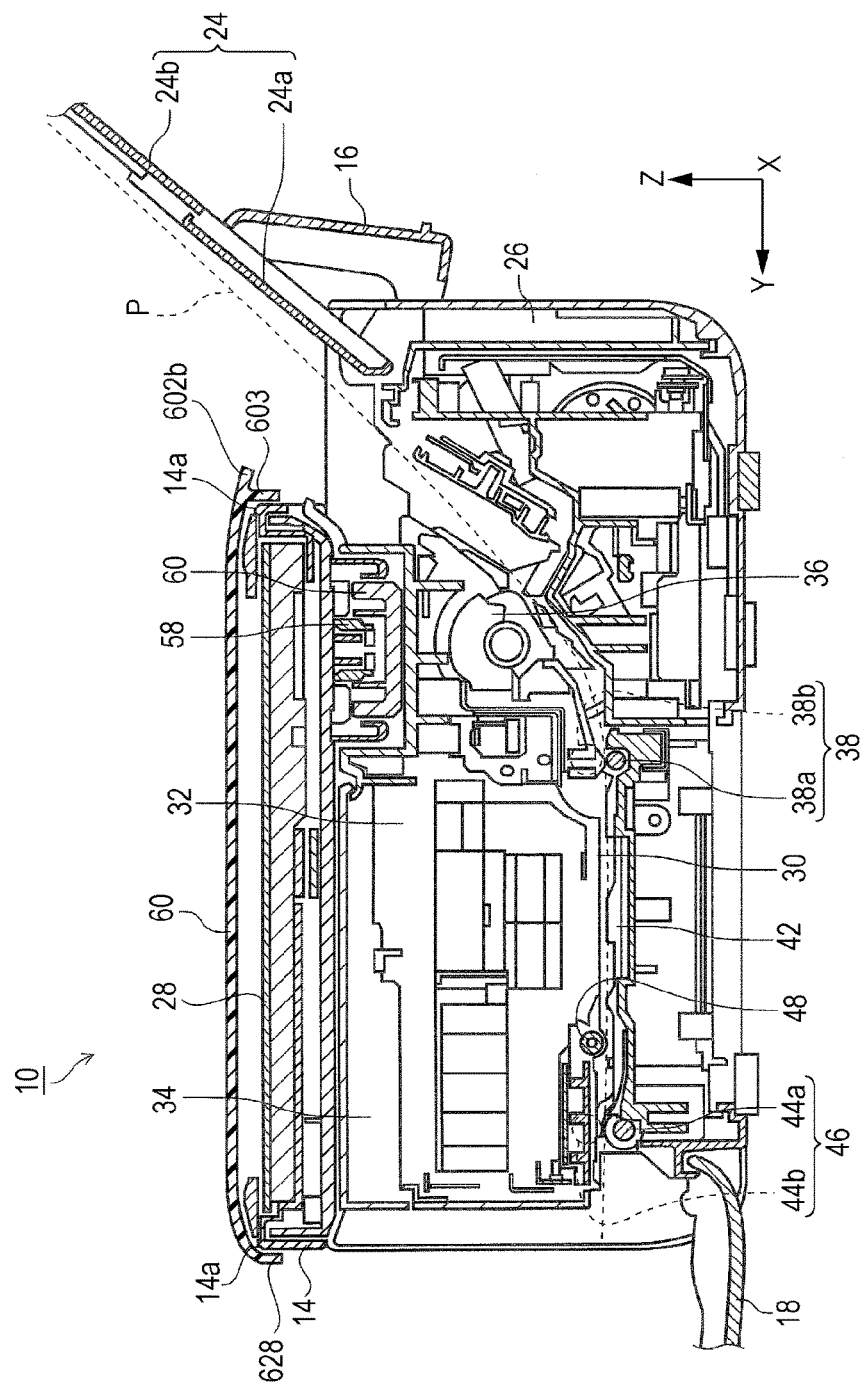
FIG. 5 is a cross sectional view of the recording apparatus.
Figure 6:
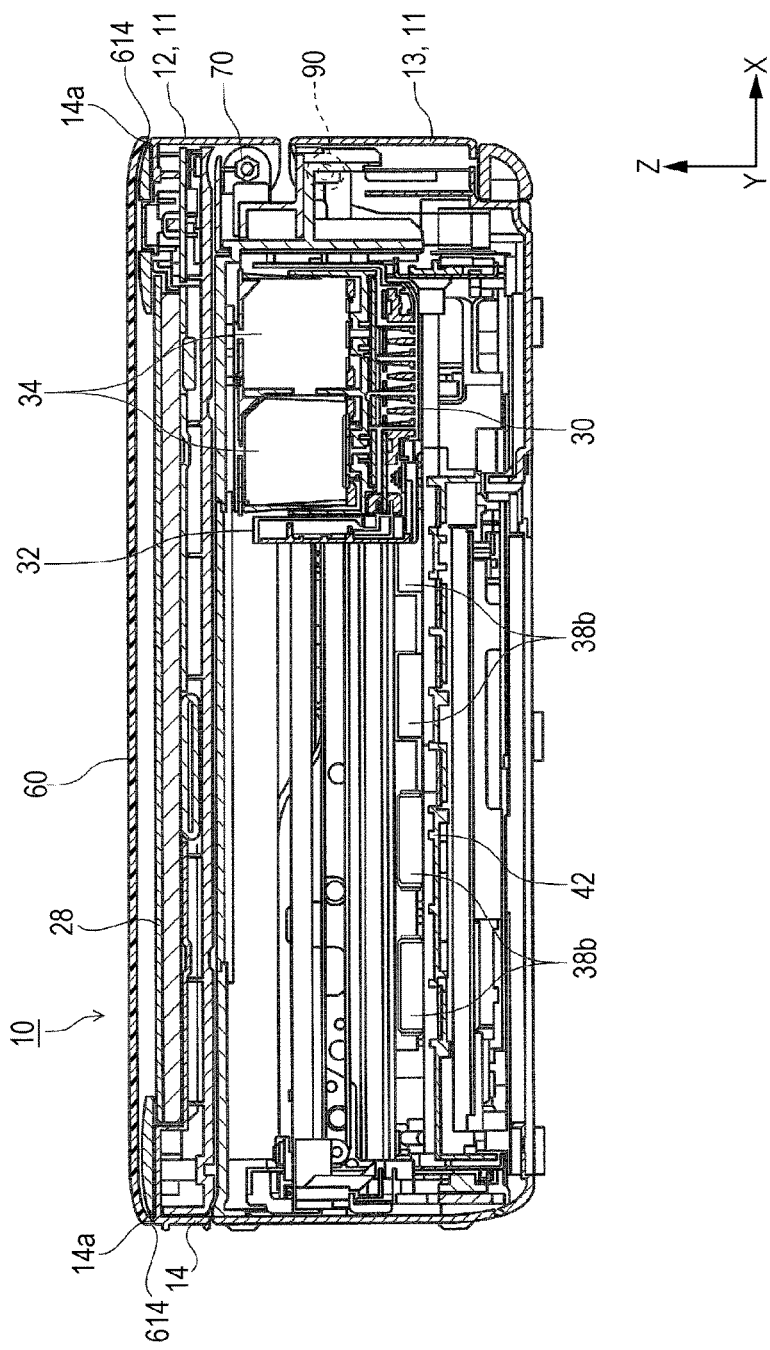
FIG. 6 is a cross sectional view of the recording apparatus.

Next, a brief explanation of an inner configuration of the printer 10 and a transportation path of the paper sheet P will be described. FIG. 5 is a cross sectional view taken along the line V-V of FIG. 2. FIG. 6 is a cross sectional view taken along the line VI-VI of FIG. 1. In FIG. 5, the transportation path of the paper sheet P is indicated by the dotted line. In the printer 10, the paper sheet P is transported in the +Y direction. In the following description, the direction in which the paper sheet P is transported in the printer 10 is referred to as "downstream side" (+Y direction side), and a direction opposite to the downstream side is referred to as "upstream side" (−Y direction side).

in the apparatus main body 11, a carriage 32 having a recording head 30 is disposed so as to reciprocate in a direction (X direction) which intersects with a paper sheet transfer direction (+Y direction) so that the recording head 30 performs recording operation by ejecting ink onto the paper sheet P. The recording head 30 has a nozzle row made up of a plurality of nozzles (not shown in the figure) disposed on the bottom so that the nozzles eject ink onto the paper sheet P transported under the recording head 30 while ink is supplied from a liquid storage 34 mounted on the carriage 32 via the nozzles.

The paper sheet P is fed downstream in the paper sheet transfer direction by the sheet feeding roller 36. The paper sheet P fed by the sheet feeding roller 36 is transported into a recording area under the recording head 30 (−Z direction) while being pinched by a transportation roller pair 38 which is made up of a transportation driving roller 38a and a transportation driven roller 38b.

A support member 42 is disposed on a side facing the recording head 30 (under the recording head 30) so as to regulate a paper sheet gap between a liquid ejecting surface (bottom) of the recording head 30 and the paper sheet P. When ink is ejected from the recording head 30 onto the paper sheet P between the recording head 30 and the support member 42, the recording operation is performed.

An output roller pair 46 which is made up of an output driving roller 44a and an output driven roller 44b is disposed on the downstream side of the recording head 30 in the paper sheet transfer direction. Further, a rotation body 48 as a lift prevention section may be disposed between the recording head 30 and the output roller pair 46. The rotation body 48 is disposed on the transportation path of the paper sheet P from the recording head 30 to the output roller pair 46 so as to be rotated while coming into contact with the recording surface of the paper sheet P, thereby preventing the paper sheet P from being lifted from the support member 42 and maintaining a distance between the paper sheet P and the recording head 30.

The paper sheet P, which is transported on the support member 42 after the recording operation, is transported downstream by the output roller pair 46 so as to be ejected from the paper sheet output unit 41 shown in FIG. 2, and then placed on the paper output cover 18 in the open state.

Figure 7:
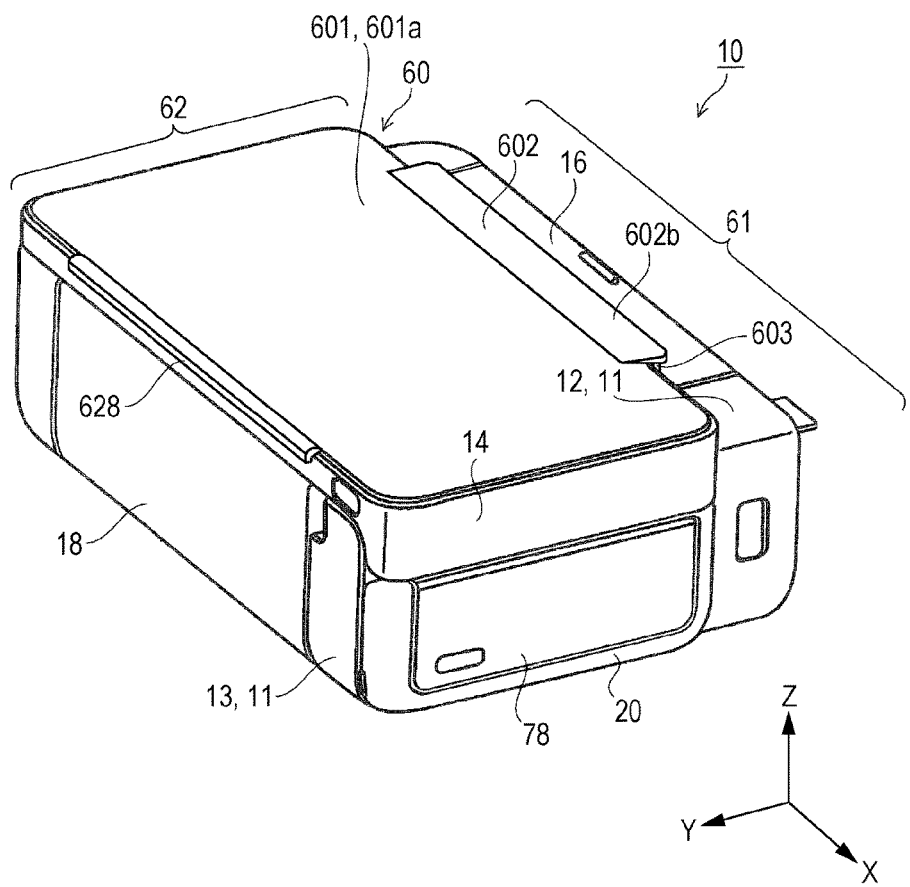
FIG. 7 is a perspective view of an outer appearance of the recording apparatus with the cover mounted.

FIG. 7 is a perspective view of an outer appearance of the printer 10 in which a cover 60 as an example of a cover section is mounted on the panel 14 of FIG. 1. The cover 60 has an outer shape seen in the Z direction having a pair of short sides 62 and a pair of long sides 61 and is formed as a substantially rectangular shape with four rounded corners. The cover 60 is formed by resin molding of a resin material. The resin material may be, for example, block polypropylene having a low shrinkage ratio.

The cover 60 is detachably mounted on the panel 14 with the short side 62 corresponding to the short side 50 (see FIG. 1) of the panel 14 and the long side 61 corresponding to the long side 52 (see FIG. 1) of the panel 14.

A hand held section 602 is disposed on the cover 60 of FIG. 7 on the back side of the main body 601 so as to protrude backward from the main body 601 in the X direction. A user can grip the protruding section 602b on the back side of the hand held section 602 to remove the cover 60 from the panel 14. The hand held section 602 has an embossed surface 602a so as to prevent finger slip when the hand held section 602 is pressed with a finger to mount the cover 60.

Figure 8:
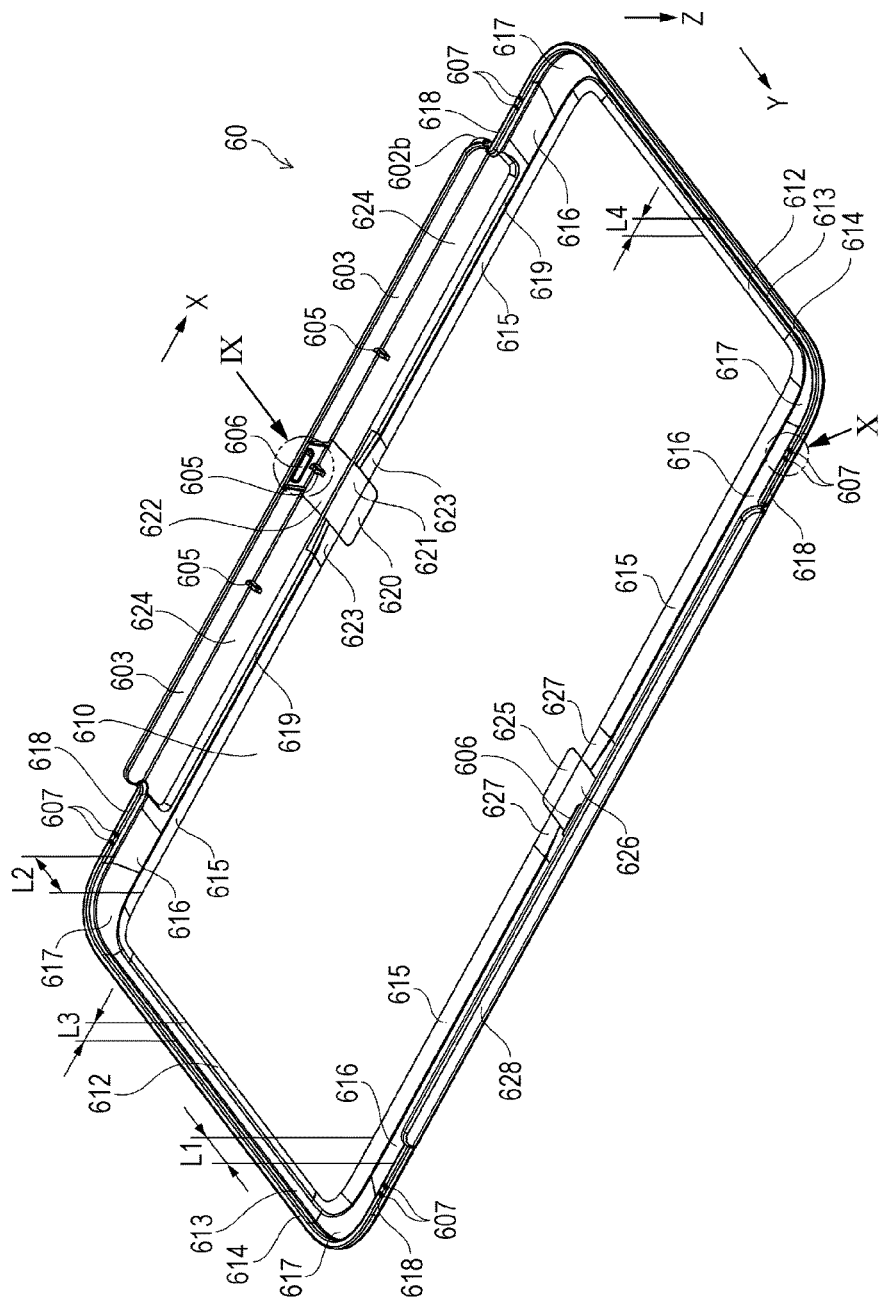
FIG. 8 is a perspective view of the cover.

FIG. 8 is a perspective view of the cover 60 seen from the opposite side of the surface 601a of the main body 601 of FIG. 7. A thick-wall portion 610 which is a wall having a substantially uniform thickness in the Z direction is formed in the center of the cover 60. The thick-wall portion 610 has an outline extending along the outer shape of the cover 60 and is formed in a substantially rectangular shape with four rounded corners.

The thick-wall portions 622, 624 of FIG. 8 form the opposite side of the surface 602a of the hand held section 602 of FIG. 7 in the Z direction. The thick-wall portion 622 is formed at the center in the X direction and the thick-wall portions 624 are formed on both sides of the thick-wall portion 622 with the upper surface of the thick-wall portion 622 being located higher than the upper surface of the thick-wall portions 624. The protruding section 602b protrudes outward from a protruding wall 603 in the −Y direction and extends in the X direction.

Inclined portions 612 and thin-wall portions 613 are disposed on both sides of the thick-wall portion 610 of FIG. 8 in the X direction and extend in the Y direction. The thin-wall portion 613 is a wall having a substantially uniform thickness in the Z direction which is smaller than the thickness of the thick-wall portion 610. The inclined portion 612 has an inclined upper surface which becomes lower toward the thin-wall portion 613 which is located on the outside in the X direction. That is, the inclined portion 612 has a shape which continuously becomes thinner toward the thin-wall portion 613 on the outside.

Inclined portion 615 and thin-wall portion 616 are disposed outside of the thick-wall portion 610 in the +Y direction and extend in the X direction. The inclined portion 615 and the thin-wall portions 616, 619 are disposed outside of the thick-wall portion 610 in the −Y direction and extend in the X direction.

The thin-wall portion 619 is formed between the thick-wall portion 624 and the inclined portion 615 in the Y direction and extends along the thick-wall portions 622, 624 in the X direction. The thin-wall portion 616 is formed outside of the thin-wall portion 619 in the X direction.

The thin-wall portions 616, 619 are walls having a substantially uniform thickness in the Z direction which is smaller than the thickness of the thick-wall portion 610. The thin-wall portion 619 has a thickness smaller than the thin-wall portion 616. The inclined portion 615 has an inclined upper surface which becomes lower toward the thin-wall portion 616 which is located on the outside in the Y direction. That is, the inclined portion 615 has a shape which continuously becomes thinner toward the thin-wall portion 616 on the outside.

An abutment section 614 is formed on the outer periphery of the thin-wall portion 613 so as to extend from the thin-wall portion 613 in the −Z direction and extends in the Y direction. An abutment section 618 is formed on the outer periphery of the thin-wall portion 616 so as to extend from the thin-wall portion 616 in the −Z direction and extends in the X direction.

Thin-wall portions 617 are formed on four corners of the cover 60 having a rectangular shape so as to be connected to the thin-wall portions 613, 616. The thin-wall portions 617 are walls having a substantially uniform thickness in the Z direction which is the same thickness as that of the thick-wall portions 613, 616.

The thin-wall portions 617 are formed in an arc shape seen in the Z direction and the outer periphery of the thin-wall portions 617 are connected to portions extending from both ends of the abutment section 614 in the Y direction and portions extending from both ends of the abutment section 618 in the X direction.

Thick-wall portions 620, 621 are formed in the −Y direction with respect to the center of the thick-wall portion 610 in the X direction. Inclined portions 623 extend on both sides of the thick-wall portion 621 in the X direction.

The upper surface of the thick-wall portion 620 is higher than the upper surfaces of the thick-wall portions 610, 621 and the upper surface of the thick-wall portion 621 is lower than the upper surface of the thick-wall portion 622. The upper surface of the inclined portion 623 becomes lower toward the outside in the X direction and is connected to the inclined portion 615.

Thick-wall portions 625, 626 are formed in the +Y direction with respect to the center of the thick-wall portion 610 in the X direction. Inclined portions 627 extend on both sides of the thick-wall portion 626 in the X direction. The upper surface of the thick-wall portion 625 is higher than the upper surfaces of the thick-wall portions 610, 626. The upper surface of the inclined portion 627 becomes lower toward the outside in the X direction and is connected to the inclined portion 615.

The inclined portions 612 and the thin-wall portions 613 of FIG. 8 disposed along a pair of short sides 62 of FIG. 7 form short side areas. The inclined portions 615 and the thin-wall portions 616, 619 of FIG. 8 disposed along a pair of long sides 61 of FIG. 7 form long side areas.

Further, the short side areas and the long side areas form an outside area which is an example of a first area. The thin-wall portions 617 formed on four corners of the cover 60 are included in the outside area. An inside area which is an example of a second area is formed of the thick-wall portion 610 which is surrounded by the outside area.

The long side areas formed of the inclined portion 615 and the thin-wall portion 616 have the width lengths L1, L2 in the Y direction (a direction intersecting with the X direction in which the long side 61 extends) which are longer than the width lengths L3, L4 in the Y direction (a direction intersecting with the Y direction in which the short side 62 extends) of the short side areas formed of the inclined portions 612 and the thin-wall portions 613 in the X direction.

A protruding wall 603 (see FIG. 7) is formed on the end of the cover 60 in the +Y direction so as to protrude in the −Z direction and extend in the X direction, and a protruding wall 628 is formed on the end of the cover 60 in the −Y direction so as to protrude in the −Z direction and extend in the X direction. The protruding walls 603, 628 are each formed at positions outside the abutment section 618 in the Y direction.

Figure 9:
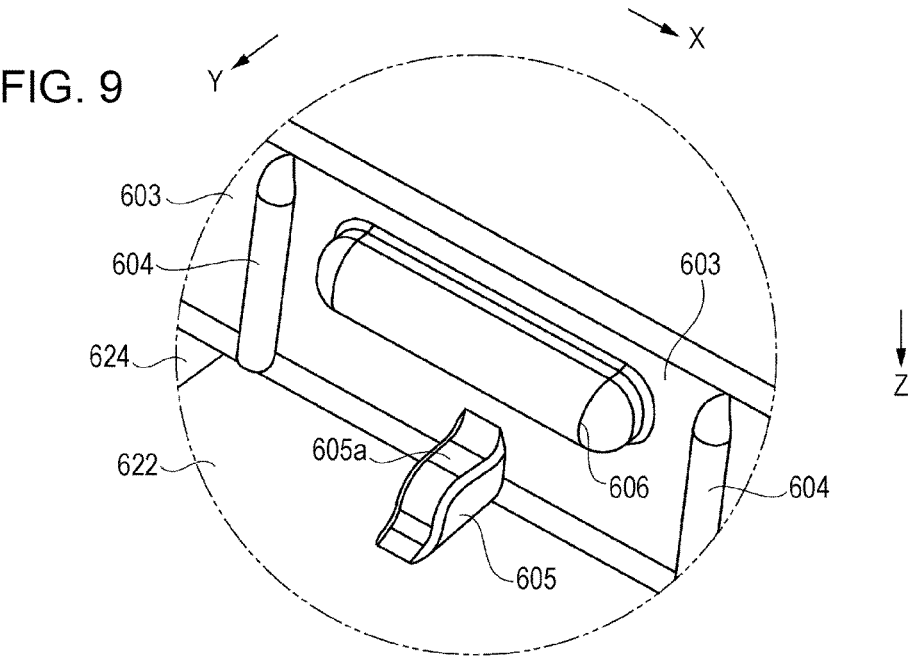
FIG. 9 is an enlarged perspective view of a portion having the engaging section and the protruding section.

Engaging sections 606 are formed on the inner side of the protruding walls 603, 628 in the Y direction. FIG. 9 is an enlarged perspective view of a portion having the engaging section 606 and a protruding section 605 of FIG. 8 (a portion indicated by the dotted line circle IX). The engaging section 606 is disposed between a pair of ribs 604 on the protruding wall 603. In the present embodiment, the engaging sections 606, which are formed in a columnar shape having a semicircular cross section, protrude inward from the protruding walls 603, 628 in the Y direction and extend in the X direction. Further, a resin injecting position through which resin is injected during molding is disposed, for example, at a position facing the engaging section 606 on the protruding wall 603 or 628. Since the resin injecting position is formed at a position facing the engaging section 606, no resin injection protrusion remains on the outer appearance surface, which improves the visual appearance. Further, when the resin injecting position is formed on the protruding wall 603 located close to the hand held section 602, the resin injecting position is located on the back side of the main body 601 of the cover 60, thereby further improving the visual appearance.

Three protruding sections 605 are formed on the inner corner between the thick-wall portions 622, 624 and the protruding wall 603 of FIG. 8 so as to be positioned side by side in the X direction. The protruding sections 605 are located at the positions of the abutment sections 618 in the Y direction, and the abutment sections 618 are not formed on the thick-wall portions 622, 624.

The upper surface 605a of the protruding section 605 of FIG. 9 is at the same height as the upper surface of the abutment section 618 in the Z direction. Three protruding sections (not shown in the figure) having the same shape as the protruding sections 605 are disposed side by side in the X direction on the inner side of the protruding wall 628 at positions facing the protruding sections 605 in the Y direction. The protruding sections 605 abut upper end 14a of the panel 14 (see FIG. 5) on the side close to the apparatus main body 11 in the state that the cover 60 is mounted on the panel 14. Further, since the protruding section 605 is not formed at the cross-sectional position of FIG. 5, the protruding section 605 is not shown on the upper side of the upper end 14a.

Figure 10:
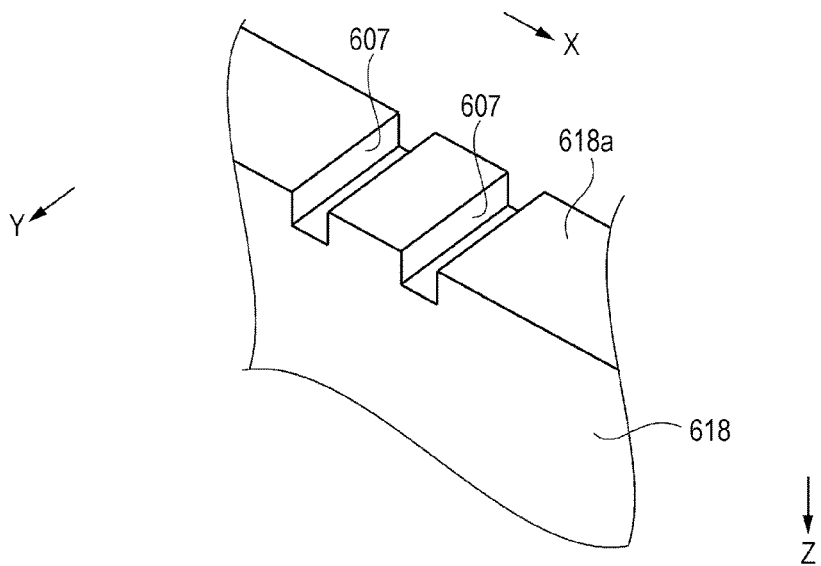
FIG. 10 is an enlarged perspective view of a portion having a notch.

In the abutment section 618, a pair of notches 607 are formed at four positions. FIG. 10 is an enlarged perspective view of a portion having a pair of notches 607 of FIG. 8 (a portion indicated by the dotted line circle X). As shown in FIG. 10, a flat area 618a is formed on the upper surface of the abutment section 618. The notch 607 is a recess formed in the upper part of the abutment section 618 so as to extend in the Y direction.

As shown in FIG. 1, an engaged section 59 into which the engaging section 606 of FIG. 8 can fit is formed on the front side of the panel 14. The engaged section (not shown in the figure) having a recess into which the engaging section 606 can fit is also formed on the back side of the panel 14. In the state that the cover 60 is mounted on the panel 14, the engaging sections 606 provided on the protruding walls 603, 628 of the cover 60 engage with the engaged section 59 on the front side of the panel 14 and the engaged section on the back side of the panel 14.

The protruding walls 603, 628 functions as a guide section that guides a mounting position when a user mounts the cover 60 on the panel 14. Further, in the state that the cover 60 is mounted on the panel 14, the protruding walls 603, 628 regulate the cover 60 from moving in the Y direction to the panel 14.

As shown in FIG. 6, in the state that the cover 60 is mounted on the panel 14, the abutment sections 614, 618 are located at positions facing the upper end 14a of the outer periphery of the panel 14 and abut the upper end 14a. A surface of the upper end 14a which abuts the abutment sections 614, 618 is a curved surface. Further, since the abutment section 618 is not formed at the cross-sectional position of FIG. 5, the abutment section 618 is not shown on the upper side of the upper end 14a.

A recording unit of the printer 10 of the present embodiment includes the recording head 30, the reciprocating carriage 32 that includes the recording head 30, and the transportation roller pair 38 that transports the paper sheet P.

The printer 10 of FIG. 1 described in the present embodiment includes the apparatus main body 11 provided therein with the recording unit that performs recording on the paper sheet P serving as a medium to be recorded, the panel 14 that is provided in the apparatus main body 11 and that supports the outer periphery of the display 28 that displays various pieces of information and the like, and the cover 60 formed of a resin material. The cover 60 includes a covering section that covers the display 28, and the abutment sections 614, 618 that are formed on the outer periphery of the covering section and that abut against the panel 14. Furthermore, the covering section includes the thin-wall portions 613, 616, 617, 619 and the inclined portions 612, 615 that are disposed along the outer periphery and that serve as the outside area, and the thick-wall portion 610 that is disposed inside the outside area and that serves as the inside area. The thickness of the outside area is smaller than the thickness of the inside area.

With this configuration, when forming the cover 60 by resin molding, the liquid resin material that has flowed to the outside area solidifies more quickly than the liquid resin material that has flowed to the inside area. Accordingly, warpage (deformation) in the outside area can be suppressed. As a result, the gap created between the panel 14 and the cover 60 can be made small, thereby preventing dirt and dust from entering through the gap and adhering to the display 28. Furthermore, scratches that are created by the user wiping off dirt and dust adhered to the display 28 and that makes the display 28 unclear can be prevented.

Furthermore, the outer periphery of the abutment section 614 includes the pair of short sides 62 of FIG. 7, and the abutment section 618 of FIG. 8 includes the pair of long sides 61 that extend in the direction intersecting the direction in which the short side 62 extends. The outside area of the covering section includes the thin-wall portion 613 and the inclined portion 612 that is the short side area disposed along the short side 62 and the thin-wall portions 616, 619 and the inclined portion 615 that is the long side area disposed along the long side 61. The widths L1, L2 that are in the long side area and extend in the direction intersecting the extending direction of the long side 61 has a portion larger than the widths L3, L4 that are in the short side area and extend in the direction intersecting the extending direction of the long side 61.

When the liquid resin material in the short side area solidifies before the solidification of the liquid resin material in the long side area, the shape of the resin in the long side area being influenced by the deformed portion of the short side area that has solidified before the resin in the long side area may have a larger warpage. According to the configuration of the present embodiment, when forming the cover 60 by resin molding, the liquid resin material in the long side area solidifies before the liquid resin material in the short side area. Accordingly, warpage in the long side area can be suppressed.

Furthermore, the inclined portions 612, 615 that have inclined surfaces connected to the inside area and inclined such that a thickness continuously decreases toward the outer side are formed in the outside area.

Such a configuration facilitates the liquid resin material to flow towards the outside area along the inclined surfaces (not shown) of the mold for forming the inclined surfaces of the inclined portions 612, 615. Accordingly, the liquid resin material that has flowed into the outside area solidifies at an earlier stage with respect to the solidification of the liquid resin material that has flowed into the inside area. As a result, the warpage (the deformation) of the outside area can be suppressed.

Furthermore, the abutment sections 614, 618 protrude in the thickness direction of the covering section (the Z direction in FIG. 8). Specifically, the abutment sections 614, 618 protrude with respect to the covering section in a direction abutting against the panel.

With this configuration, the abutment sections 614, 618 of the cover 60 serve as ribs. Accordingly, the rigidity of the cover 60 can be increased, thereby protecting the display 28 from external impact and pressure. Furthermore, since a space is created between the covering portion of the cover 60 and the display 28, even if the covering section is bent towards the display 28 due to external impact and pressure applied on the cover 60, contact between the covering section and the display 28 can be avoided, thereby preventing the display 28 from being damaged.

Figure 11A:
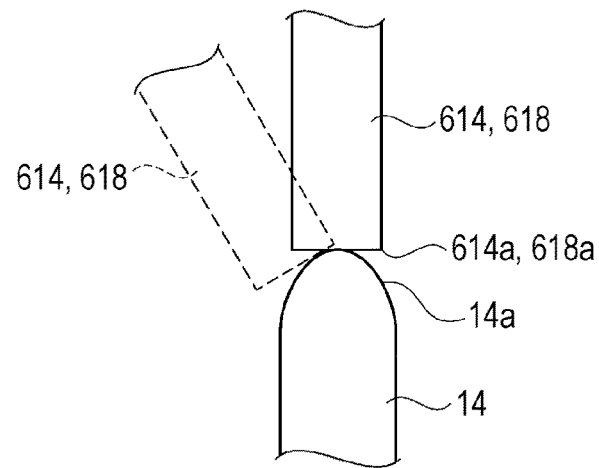
FIGS. 11A and 11B are enlarged cross sectional views of a portion in which the abutment section of the cover abuts the panel.

FIG. 11A is a diagram viewed in the direction in which the abutment sections 614, 618 extend and is an enlarged cross-sectional view of a portion where the abutment sections 614, 618 of the cover 60 abut against the panel 14. As shown in FIG. 11A, flat areas 614a, 618a are formed so as to extend in the direction in which the abutment sections 614, 618 extend. The surface of the upper end 14a of the panel 14 that abuts against the flat areas 614a, 618a is a curved surface.

Accordingly, the upper end 14a and the flat areas 614a, 618a reliably abut against each other, thereby preventing dust and dirt from entering the display side and adhering to the display.

Figure 11B:
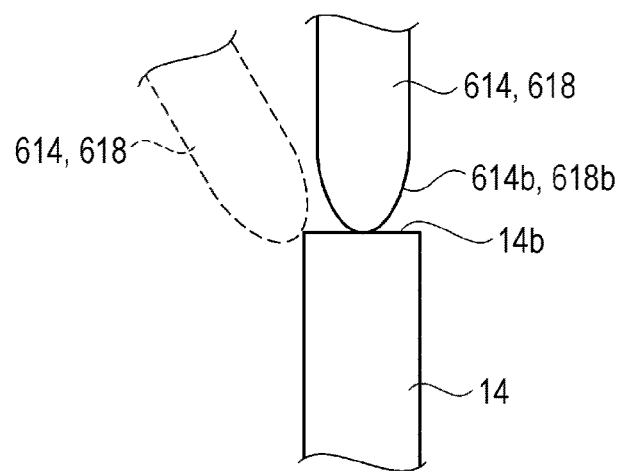

As shown in FIG. 11B, curved portions 614b, 618b may be formed in the direction in which the abutment sections 614, 618 extend, and the surface of the upper end 14b of the panel 14 that abuts against the curved portions 614b, 618b may be flat surface.

When mounting the cover 60 on the panel 14, the user may mount the cover 60 on the panel 14 while the cover is inclined. For example, the user inclines the cover 60 so that the backside is higher, and after rotating the cover 60 to a horizontal position while abutting the cover 60 against the front side of the panel 14, the user presses the hand held section 602 on the backside of the panel 14 with a finger.

As shown in FIG. 11A, when the abutment sections 614, 618 of the cover 60 include the flat areas 614a, 618a, as indicated by the dotted line, even if the abutment sections 614, 618 are abutted against the upper end 14a of the panel 14 while being in an inclined state with respect to the Z direction, the abutment sections 614, 618 moves along the curve of the upper end 14a and the abutment sections 614, 618 and the upper end 14a of the panel 14 are in an abutment state.

Conversely, as shown in FIG. 11B, when the abutment sections 614, 618 of the cover 60 include the curved portions 614b, 618b, as indicated by the dotted line, when the abutment sections 614, 618 are abutted against the upper end 14b of the panel 14 while being in an inclined state with respect to the Z direction, the abutment sections 614, 618 may come in contact with the corner of the upper end 14b. In that case, the user needs to adjust the position of the cover 60 so that the abutment sections 614, 618 go over the corner of the upper end 14b and mount the cover 60 on the panel 14 at a position where the abutment sections 614, 618 and the upper end 14b abut against each other.

Accordingly, from a viewpoint of workability when mounting the cover 60 on the panel 14, the case in which the flat areas 614a, 618a are formed in the abutment sections 614, 618 of FIG. 11A and in which the upper end 14a of the panel 14 is a curved surface is advantageous over the case in which the curved portions 614b, 618b of FIG. 11B are formed in the abutment sections 614, 618 and in which the upper end 14b of the panel 14 is a flat surface.

Further, the thick-wall portions 622, 624 that form the hand held section 602 is formed on the outer periphery of the covering section, the thin-wall portion 619 that is connected to the thick-wall portions 622, 624 and extends along the thick-wall portion 622, 624 is formed on the covering section, and the thin-wall portion 619 has a thickness smallest in the covering section.

With this configuration, when forming the cover 60 by resin molding, the liquid resin material that has flowed to the thin-wall portion 619 solidifies more quickly. Accordingly, warpage in the thin-wall portion 619 can be suppressed. Therefore, deformation of the hand held section 602 due to deformation of the thin-wall portion 619 which serves as a support portion of the hand held section 602 can be suppressed.

Further, notches 607 are formed on the abutment sections 618 of FIG. 8. This allows air to flow through the notches 607 when the cover 60 is removed from the panel 14, thereby facilitating removal of the cover 60.

The abutment sections 614, 618 may be provided with an elastic member such as rubber. This improves sealing properties between the abutment sections 614, 618 and the upper end 14a of the panel 14.

Furthermore, the thick-wall portions 620, 621, 622, 625 and 626 are formed at positions close to the engaging sections 606. This improves the rigidity, thereby preventing deformation and damage of the cover 60 during engagement of the engaging section 606 and the engaged section 59 of FIG. 1.

Although the abutment sections 614, 618 in the above embodiment are formed to protrude from the covering section, the abutment sections 614, 618 may be formed to have the same thickness as that of the wall that forms the outer area of the covering section so as not to protrude from the covering section.

Although the cover 60 in the above embodiment has a substantially rectangular shape as seen in the thickness direction, the cover 60 may have a circular shape or an elliptical shape.

The entire disclosure of Japanese Patent Application No. 2015-146427, filed Jul. 24, 2015 is expressly incorporated by reference herein.

What is claimed is:

1. A recording apparatus comprising:
an apparatus main body which includes a recording unit that performs recording on a recording medium and a panel that supports a display which displays various information; and
a cover made of a resin material, wherein
the cover includes a covering section that covers the display and an abutment section formed on an outer periphery of the covering section so as to abut an outer peripheral surface of the panel of the apparatus main body, the abutment section protrudes in a thickness direction of the covering section, a flat area is formed in an extending direction of the abutment section, and a surface of the apparatus main body which abuts the flat area is a curved surface,
the covering section is made up of a first area formed along at least a part of the abutment section and inside of the outer periphery of the cover and a second area disposed inside the first area and away from the abutment section, and
the first area has a thickness smaller than a thickness of the second area and an area towards the outer periphery of the second area, and different from the first area, has a thickness greater than the first area.

2. The recording apparatus according to claim 1, wherein the abutment section includes a first side made up of a pair of sides and a second side which extends in a direction intersecting with an extending direction of the first side and is made up of a pair of sides having a length larger than a length of the first side,
the first area of the covering section is made up of a first side area which is disposed along the first side and a second side area which is disposed along the second side, and
a width of the second side area in a direction intersecting with an extending direction of the second side has a portion larger than a width of the first side area in a direction intersecting with an extending direction of the first side.

3. The recording apparatus according to claim 1, wherein the first area is connected to the second area and includes an inclined portion having an inclined surface that is inclined such that a thickness of the inclined portion continuously decreases toward the first area.

4. The recording apparatus according to claim 1, wherein the abutment section protrudes in a thickness direction of the covering section.

5. The recording apparatus according to claim 1, wherein
a thick-wall portion that forms a hand held section is formed on the outer periphery of the covering section,
a thin-wall portion that is connected to the thick-wall portion and extends along the thick-wall portion is formed on the covering section, and
the thin-wall portion has a thickness smaller than a thickness of the covering section.

6. The recording apparatus according to claim 1, wherein
the cover includes protruding walls that are formed on the end of the cover and engaging sections that are formed on the inner side of the protruding walls and are detachably mounted on the panel and,
the engaging sections engage with an engaged section on the front side of the panel and a engaged section on the back side of the panel in the state that the cover is mounted on the panel to cover the display.

7. A recording apparatus comprising:
an apparatus main body which includes a recording unit that performs recording on a recording medium and a panel that supports a display which displays various information; and
a cover made of a resin material, wherein
the cover includes:
- a covering section that covers the display;
- an abutment section formed on an outer periphery of the covering section so as to abut an outer peripheral surface of the panel of the apparatus main body; and
- protruding walls that are formed on the end of the cover and engaging sections that are formed on the inner side of the protruding walls and are detachably mounted on the panel, the engaging sections engage with an engaged section on a front side of the panel and a engaged section on the back side of the panel in the state that the cover is mounted on the panel to cover the display,
- wherein, the covering section is made up of a first area formed along at least a part of the abutment section and inside of the outer periphery of the cover and a second area disposed inside the first area and away from the abutment section, and
- the first area has a thickness smaller than a thickness of the second area and an area towards the outer periphery of the second area, and different from the first area, has a thickness greater than the first area.

* * * * *